Figure 1:
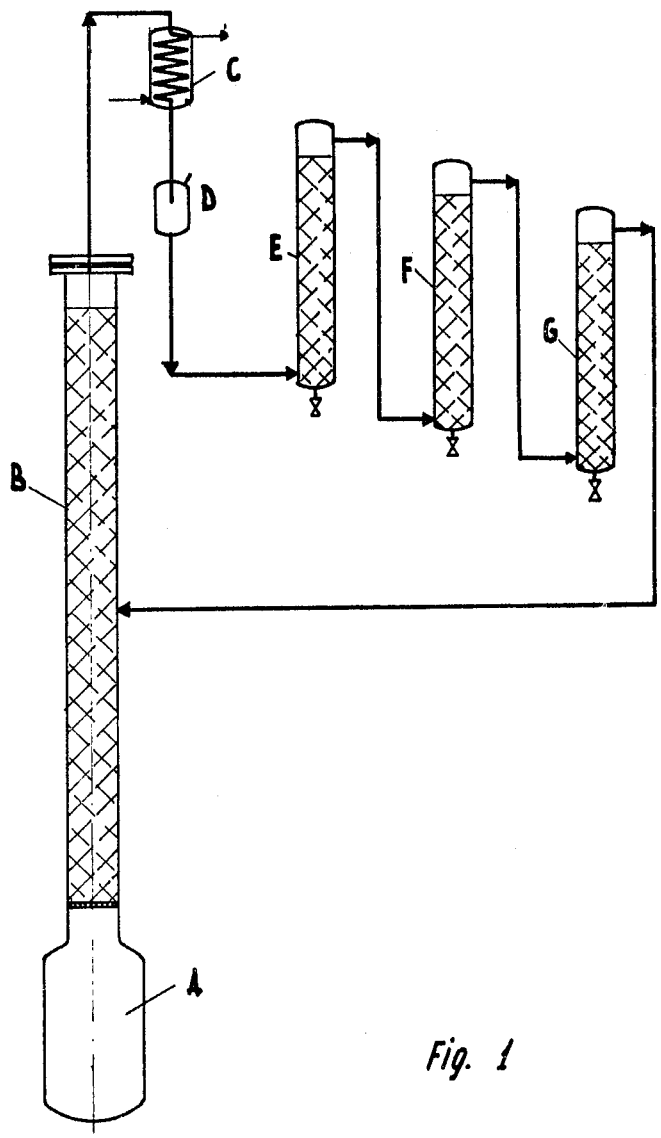

Jan. 25, 1966 G. BOFFA ETAL 3,231,609
PROCESS FOR PURIFYING ACETIC ACID CRUDES
Filed April 23, 1963 2 Sheets-Sheet 1

INVENTOR.
Gioacchino Boffa
and
Franco Guerrieri

__United States Patent Office__

3,231,609
Patented Jan. 25, 1966

3,231,609
PROCESS FOR PURIFYING ACETIC ACID CRUDES
Gioacchino Boffa and Franco Guerrieri, Novara, Italy, assignors to Montecatini Societa Generale per l'Industria Mineraria e Chimica, Milan, Italy
Filed Apr. 23, 1963, Ser. No. 274,963
Claims priority, application Italy, Apr. 27, 1962, 8,363
4 Claims. (Cl. 260—541)

This invention relates to the purification of crude acetic acid resulting from the oxidation of lower aliphatic hydrocarbons.

Such oxidation processes yield acetic acid together with minor amounts of formic acid, higher acids and other oxygenated volatile organic products (alcohols, ketones, esters, etc.). All of these products are present in the crude diluted with water. German Patent 1,074,027; U.S. Patents 2,659,746 and 2,653,962 as well as the British Patent 709,674 describe such processes and the resultant inherent impurities.

The separation of the oxygenated volatile products, many of which may be recycled, does not involve difficulties. These products during the first distillation of the crude form two liquid phases and the lower aqueous phase is recycled back into the reactor and distillation column as reflux.

The separation of the acetic acid from the higher acids is usually carried out after a dehydration step performed with the aid of an azeotropic agent. This latter acts also as a carrier for the formic acid. However, the so prepared acetic acid is not adequately purified since it contains a considerable amount of by-products, determinable on the basis of their reducing action on permanganate. The amount of such reducing impurities is referred to as the permanganate index. Such reducing by-products apparently cannot be removed by rectification alone since they distill over with the acetic acid.

It has already been proposed to remove these reducing products by reduction with hydrogen in the presence of a hydrogenation catalyst (Italian Patent No. 563,566). In this manner according to this method the potassium permanganate index of the acetic acid is reduced but the impurities merely remain therein in another form.

An object of this invention is to provide novel processes for removing permanganate reducing impurities in a simple and economical manner.

Another object is to provide a process according to this invention that can easily be carried out in a continuous operation.

The crude acetic acid coming from the oxidation of lower aliphatic hydrocarbons is initially distilled by known methods to separate the high-boiling products that are discharged, and the oxygenated volatile products that are recycled (U.S. Patent 2,893,923). The crude acetic acid as obtained contains also homologous acids (formic, propionic, etc.) and the aforesaid reducing impurities. The purification by the process of this invention is carried out on this aqueous crude.

According to one aspect of this invention, the crude acetic acid is purified by distilling the crude and contacting the aqueous condensate with water-insoluble solvents which preferentially dissolve the impurities, and then recycling the aqueous phase into the distillation vessel. The recycling is continued until the acid in the retort or boiler shows the desired degree of purification as evidenced by the permanganate index. The solvents for the preferential solution of the reducing impurities are chosen from the class of saturated aliphatic hydrocarbons, aromatic hydrocarbons, chlorinated solvents and water-insoluble aliphatic esters.

Some of the heavier impurities, that distill with difficulty, may be left in the crude and separated in the final rectification of the acetic acid. This step is preferably carried out at reduced pressures.

In order to find the most suitable solvent, extraction tests were made on a batch of aqueous crude having a high impurity content. The amount of reducing impurities was determined by the "permanganate index," as follows:

A 5 cc. sample of the crude acid is dissolved with 50 cc. of 5% sulfuric acid (weight/weight). This mixture is maintained at a temperature of 20° C. A 0.1% potassium permanganate solution is added dropwise until the pink color of the permanganate persists for one minute. The permanganate index is obtained by multiplying the volume (in cc.) of the permanganate solution used by a factor of 20.

The aqueous crude acetic acid solution containing the impurities had a permanganate index of 1000. Equal volumes of this aqueous crude solution and the solvent under test were shaken together for a few minutes and then the permanganate index of the solution was determined as mentioned above.

The results are reported in the following table. The first column indicates the solvent, the second shows the initial permanganate index of the aqueous solution, the third the index after the first extraction, the fourth the index after the second extraction, and the fifth the index after the third extraction.

Table 1

| Solvent | 0 | 1st | 2nd | 3rd |
|---|---|---|---|---|
| Heptane | 1,000 | 500 | 190 | 141 |
| Toluene | 1,000 | 200 | 120 | 80 |
| DCE | 1,000 | 60 | 26 | 6 |

It is apparent that dichloroethane (DCE) was the best solvent. Chloroform, carbon tetrachloride, the liquid water-insoluble esters (such as amyl acetate) behave like dichloroethane. The saturated aliphatic hydrocarbons exhibit a behavior similar to heptane, and the aromatic ones are similar to toluene.

The dichloroethane after use in this extraction can be easily purified by extractive washing with water in a column, and the impurities are taken up by the water. If unsaturated aliphatic hydrocarbons are employed, the purification may be carried out with concentrated sulfuric acid and the impure benzines may then be recycled to the oxidation.

The invention will be more fully described with reference to the drawing where

FIG. 1 schematically shows a laboratory set-up and

Figure 2:
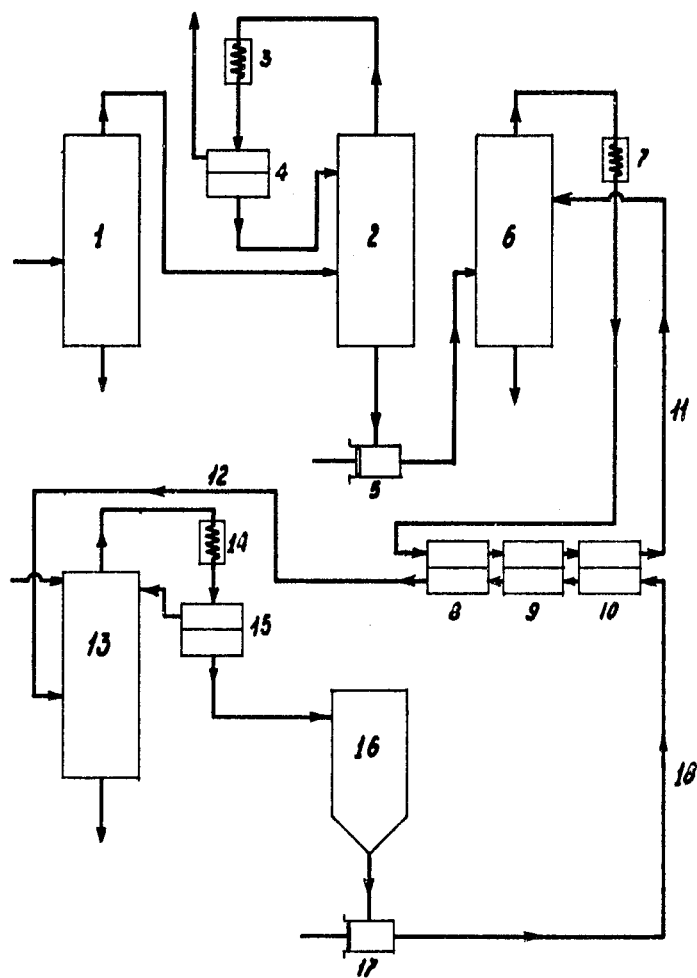

FIG. 2 shows an industrial set-up for carrying out this invention.

The purification in the laboratory is carried out with the apparatus shown in FIG. 1. The crude aqueous acetic acid is distilled from flask A. The vapors pass through the column B packed with Raschig rings, distill overhead and are condensed in the receiver C. From receiver C the liquid drops into funnel D and passes through three small columns packed with rings (indicated by E, F, G) and containing the solvent for extraction of the impurities. From the last small column the liquid is returned to the middle of column B. The small washing columns contain the solvent up to the packing level and are arranged in cascade fashion in order to allow for gravity flow of the solvent used for the extraction of the impurities.

FIG. 2 represents the scheme for an industrial operation. The crude from the oxidation is first distilled in order to separate the light fractions (unreacted hydrocarbons, acetone, methyl acetate, acetaldehyde, methyl formate, etc.). The resultant crude is then fed to a first column (not represented) where the head temperature is about 60° C. and the bottom temperature is about 103° C. The product from the base of this column is fed to column 1, where the head temperature is 103 to 104° C. and the bottom temperature is 125 to 130° C. The high-boiling products are withdrawn from the base of column 1 while the heads pass into distillation column 2 (head temperature 92 to 103° C., bottom temperature 102 to 104° C.). The heads of 2 are condensed in 3 and sent to separator 4. The upper organic layer contains the volatile oxygenated products and is recycled to the oxidation reactor. The lower aqueous layer is returned to the distillation column 1.

The tails of column 2 consist of impure aqueous acids (formic, acetic, propionic, etc., water, other impurities). The process of purification according to this invention operates on this acid mixture which is called the crude aqueous acetic acid herein. The mixture is fed by pump 5 to distillation column 6 at total reflux (head temperature 98 to 102° C. and tail temperature 104 to 105° C.). The heads of 6 are condensed in 7, washed in countercurrent extractors 8, 9 and 10 with the selected solvent, and returned through column 11 into column 6. The countercurrent extractors 8, 9 and 10 are packed columns containing Raschig rings and operate at atmospheric pressure and room temperature. If dichloroethane is employed as a solvent, it is pumped to the head of each extractor and descends downward; the aqueous acetic crude product is fed at the base and rises upward through the dichloroethane in the shape of fine droplets. The aqueous acetic crude products separate at the head of each extractor into a layer that is pumped to the base of the subsequent extractor. The tails of 6 when purified to the desired degree are dehydrated and rectified or distilled according to techniques known per se, to yield anhydrous and pure acids (formic, acetic, propionic).

The impure solvent coming from extractors 8, 9 and 10 is purified by extractive distillation with water. It is sent through 12 into the distillation column 13 which is fed on top with water. The heads are condensed in 14 and collected in separator 15. From separator 15 the aqueous phase is sent back into the top of 13 while the solvent goes to the storage tank 16 from which it is reintroduced into the cycle through lines 17 and 18.

The following illustrative examples have been drawn from the purification of very crude material. The process of purification is faster when operating on purer materials.

*Example 1*

2000 parts by weight of an aqueous crude solution coming from the oxidation of n-butane, are predistilled to remove the high boiling products; 1850 parts by weight of this predistilled aqueous solution containing about 56% of aliphatic acids $C_1$–$C_4$ (prevailingly acetic acid) and having a permanganate index of 260, are distilled to remove the volatile products, sending back into the column the aqueous phase by means of a phase separator.

From the aqueous acid residue having a permanganate index of 180, 300 parts by volume of liquid are distilled (with the described apparatus) at head temperature of 100° C., using an eight plate column B. The condensate is passed through three columns E, F, G connected in series and packed with rings, each of them containing 50 parts by volume of dichloroethane. The condensate after washing is continuously sent back into the boiler by introducing it at the middle of the distillation column. At the end of the operation the aqueous acid in the boiler A has a permanganate index of 20, and is dehydrated with dichloroethane at ordinary pressure. It is then rectified at a residual pressure of 170 mm. Hg, with a yield of 35 parts by weight of recyclable heads having a permanganate index of 20, 895 parts by weight of acetic acid having a permanganate index of 4, and 80 parts of residue containing the higher acids and the little volatile impurities. Permanganate time >120′.

*Example 2*

2000 parts by weight of an aqueous crude solution coming from the oxidation of a light gasoline, are predistilled to remove the high boiling products; 1450 parts by weight of this aqueous solution containing about 54% of acids from 1 to 4 carbon atoms (prevailingly acetic acid), and having a permanganate index of 330, are distilled to remove the volatile fraction.

From the aqueous acid residue having a permanganate index of 180, 275 parts by volume of liquid are removed; at head temperature of about 100° C., using an eight plate column B, and passed through three columns E, F, G connected in series which are packed with rings, and each containing 50 parts by volume of dichloroethane. The upper aqueous phase is continuously sent back into the boiler by introducing it at the middle of the distillation column. The extractors are then emptied and refilled with as much fresh dichloroethane, and 275 more parts of liquid are distilled which is sent back into the column as in the first stage of the operation. At the end of the operation the aqueous acid in the boiler A has a permanganate index of 50. The dehydration and the removal of formic acid (about 50 parts by weight) are carried out at normal pressure by means of fresh dichloroethane. The subsequent distillation, at a pressure of 170 mm. Hg, yields 90 parts by weight of heads (recyclable) having a permanganate index of 30; 540 parts by weight of acetic acid having a permanganate index of 4; and 110 parts by weight of residue containing the higher acids and the little volatile impurities.

*Example 3*

500 parts by volume of impure dichloroethane, coming from purifications, and having a permanganate index of 640, are purified by extractive distillation with 1300 parts of water, maintaining a head temperature of 72° C. The water is fed at the top of the column; the vapors of dichloroethane-water azeotrope are condensed and form two liquid layers (phases) that are separated. The thus purified dichloroethane has a permanganate index of 5–10.

It should be understood that the scope of the invention is not limited either by the examples or by the embodiments described and illustrated, but includes the equivalents and the variants. So, for example, it is possible to operate with only one high column by means of a countercurrent washing, instead of with the extractors 8, 9, 10.

We claim:

1. The process for purifying the crude aqueous acetic acid obtained from the oxidation of lower aliphatic hydrocarbons which comprises the steps of distilling the products of the oxidation reaction to remove the high-boiling products and the volatiles containing unreacted hydrocarbons, returning said volatiles to the oxidation reactor; removing the aqueous distillation cut containing the acetic acid; distilling this cut containing the crude aqueous acetic acid; contacting the latter distillate with an extraction solvent selected for reducing impurities chosen from the group consisting of aromatic hydrocarbons, saturated aliphatic hydrocarbons, chlorinated saturated hydrocarbons and the water-insoluble alkyl esters of saturated aliphatic acids; recovering the extracted distillate and redistilling and reextracting the same as above until substantially free from reducing impurities.

2. The process according to claim 1, wherein the solvent is regenerated and recycled.

3. The process for purifying the crude aqueous acetic acid obtained from the oxidation of lower aliphatic hydrocarbons which comprises the steps of distilling the products of the oxidation reaction to remove the high-boiling products and the volatiles containing unreacted hydrocarbons, returning said volatiles to the oxidation reactor; removing the aqueous distillation cut containing the acetic acid; distilling this cut containing the crude aqueous acetic acid; contacting the latter distillate with dichloroethane to remove impurities from said distillate; recovering the extracted distillate and redistilling and reextracting the same as above until substantially free from reducing impurities.

4. The process according to claim 3, wherein the dichloroethane solvent is regenerated by washing with water and then recycled to the extraction steps.

References Cited by the Examiner
UNITED STATES PATENTS 2,862,854  12/1958  MacLean _____ 260—541 X
3,041,373   6/1962  Alders _____ 260—541

LORRAINE A. WEINBERGER, *Primary Examiner.*

LEON ZITVER, *Examiner.*